(12) United States Patent
Song et al.

(10) Patent No.: US 10,040,104 B2
(45) Date of Patent: Aug. 7, 2018

(54) SOIL REMEDIATION FACILITY AND SOIL REMEDIATION METHOD USING THE SAME

(71) Applicant: GS Engineering & Construction Corp., Seoul (KR)

(72) Inventors: Jeong Hoon Song, Seoul (KR); Sung Ro Lee, Seoul (KR); Jin Seok Um, Seoul (KR)

(73) Assignee: GS ENGINEERING & CONSTRUCTION CORP., Seoul (KR)

( * ) Notice: Subject to any disclaimer, the term of this patent is extended or adjusted under 35 U.S.C. 154(b) by 0 days.

(21) Appl. No.: 15/598,403

(22) Filed: May 18, 2017

(65) Prior Publication Data

US 2017/0333961 A1 Nov. 23, 2017

(30) Foreign Application Priority Data

May 20, 2016 (KR) .......................... 10-2016-0061974

(51) Int. Cl.
| | | |
|---|---|---|
| B09C 1/04 | (2006.01) | |
| B03D 1/02 | (2006.01) | |
| B09C 1/02 | (2006.01) | |
| B03B 5/34 | (2006.01) | |
| B08B 3/04 | (2006.01) | |
| B08B 3/10 | (2006.01) | |
| B03B 9/00 | (2006.01) | |
| B02C 23/20 | (2006.01) | |

(52) U.S. Cl.
CPC .................. *B09C 1/02* (2013.01); *B03B 5/34* (2013.01); *B03D 1/02* (2013.01); *B08B 3/044* (2013.01); *B08B 3/104* (2013.01); *B02C 23/20* (2013.01); *B03B 9/00* (2013.01)

(58) Field of Classification Search
None
See application file for complete search history.

(56) References Cited

U.S. PATENT DOCUMENTS 4,336,136 A * 6/1982 Giguere ............. B01D 11/0273
210/178
4,783,263 A * 11/1988 Trost ........................ B03D 1/02
134/25.1

(Continued)

*Primary Examiner* — Thomas M Lithgow
(74) *Attorney, Agent, or Firm* — Saliwanchik, Lloyd & Eisenschenk

(57) ABSTRACT

A soil remediation facility includes a first screen apparatus including a vibratory screen, a drum mixer apparatus mixing the contaminated soil with a diluent, a saturated steam and hot water, a scrubbing apparatus including a mixing container and an impeller, a second screen apparatus including a vibratory screen. The facility further includes a floatation apparatus which adds a chemical agent for generating bubbles to the soil mixture, injects an air into the soil mixture to desorb contaminants from the soil mixture, and separates the desorbed contaminants by causing the desorbed contaminants to float. The facility further includes a hydro-cyclone apparatus which swirls substances contained in the soil mixture to sort the substances depending on a particle size and a desilter which swirls substances in the soil mixture at a higher angular velocity than an angular velocity in the hydro-cyclone apparatus to sort the substances.

20 Claims, 10 Drawing Sheets

(56) References Cited

U.S. PATENT DOCUMENTS 4,923,125 A * 5/1990 Bateson .................... B03B 9/00
                                                                                                                            209/164
5,115,986 A * 5/1992 Bateson .................... B03B 9/00
                                                                                                                            241/20

* cited by examiner

SOIL REMEDIATION FACILITY AND SOIL REMEDIATION METHOD USING THE SAME

CROSS-REFERENCE TO RELATED APPLICATIONS

This application is based on and claims priority from Korean Patent Application No. 10-2016-0061974, filed on May 20, 2016, the disclosure of which is incorporated herein in its entirety by reference.

TECHNICAL FIELD

The present disclosure relates to a soil remediation facility and a soil remediation method using the same.

BACKGROUND

Today's industry has been developed almost completely based on fossil fuels. However, the environmental pollution resulting from the development of the industry has recently become a serious social problem.

The environmental pollution mentioned above can be classified broadly into air pollution, water pollution and soil contamination. In particular, the problem of soil contamination is a very serious threat to food production, inducing water pollution through contamination of groundwater. It is not easy to solve the problem of soil contamination as compared with the air pollution and the water pollution.

Among fossil fuels, oil such as petroleum or the like can be used in various industrial fields and is utilized extensively. However, for a variety of reasons such as a marine oil spill accident, carelessness in transportation and storage, and the like, a considerable amount of oil may be drained into soil, thereby causing serious soil contamination.

There is a growing interest in the techniques for artificially purifying soil contaminated with oil, because a considerable period of time is required for natural recovery of soil contaminated with oil.

Techniques such as soil washing, thermal desorption, bio-remediation and the like have been proposed as conventional methods for purifying soil contaminated with oil.

Specifically, the soil washing technique is a technique of separating contaminants from the surface of soil using water or surfactant.

In the soil washing technique, when treating soil contaminated with heavy oil or crude oil, there is problem in that the consumption of surfactant is uneconomically excessive. If water makes contact with heavy oil or crude oil, there is a problem that shows a phenomenon in which tar balls are generated and a screen is clogged by the tar balls or a phenomenon in which the contact area of a surfactant decreases and the treatment effect decreases abruptly.

The thermal desorption technique is a technique that purifies soil by a process of applying heat to soil contaminated with oil, volatilizing oil contaminants and then burning the volatilized contaminants in a combustion chamber (burner). When the volatilized contaminants are burnt in the combustion chamber, dust is generated. The dust thus generated is discharged into the atmosphere after contaminants are minimized by filtering the dust with a bag filter.

In the thermal desorption technique, when burning the contaminants volatilized from contaminated soil, oxygen is required in proportion to the carbon number of contaminants. In the case where the causative substance contaminating the soil is light oil having a relatively small carbon number, there is no problem in purifying soil by the thermal desorption technique. However, if soil is contaminated with heavy oil having a relatively large carbon number, the amount of oxygen required for burning contaminants becomes very large. The bag filters need to be increased in proportion thereto. This poses a problem in that a post-treatment facility becomes very excessive.

The bio-remediation technique is a purification technique which makes use of microorganisms. According to the EPA of US, it is generally possible to treat TPH up to 5,000 mg/kg. Typically, TPH of soil contaminated with heavy oil or crude oil exceeds 5,000 mg/kg. Thus, the treatment with microorganisms has a limitation. As used herein, the term "TPH" is an abbreviation of Total Petroleum Hydrocarbon. The higher the numerical value of TPH, the greater the degree of soil contamination.

If the soil contaminated with crude oil is left for decades, light oil components with a relatively small carbon number in the crude oil are removed in their entirety and only the hardly-degradable heavy oil components are left. It may be difficult to biologically decompose the heavy oil components. In a dry environment where the sunlight is strong, it is practically difficult to secure the supply of moisture and the breathability required for microorganisms. There is a limitation in that it is difficult to apply a bio-remediation process.

SUMMARY

Embodiments of the present disclosure provide a soil remediation facility capable of effectively remedying soil contaminated with oil or the like, and a soil remediation method using the same.

In accordance with a first aspect of the present disclosure, there is provided a soil remediation facility, including: a first screen apparatus including a first vibratory screen and configured to cause contaminated soil to pass through the first vibratory screen and to separate oversize soil clods from the contaminated soil; a drum mixer apparatus configured to receive the contaminated soil from the first screen apparatus and mix the contaminated soil with a diluent, a saturated steam and hot water; a scrubbing apparatus including a mixing container and an impeller configured to rotate to apply a shear force to the soil mixture introduced into the mixing container; a second screen apparatus including a second vibratory screen and configured to separate cleaned relatively large size of soil particles from a soil mixture produced in the scrubbing apparatus by allowing small particles and contaminants to pass through a second screen apparatus; a floatation apparatus configured to receive the soil mixture from the scrubbing apparatus, add a chemical agent for generating bubbles to the soil mixture, inject air into the soil mixture to desorb contaminants from the soil mixture, and separate the desorbed contaminants by causing the desorbed contaminants to float; a hydro-cyclone apparatus configured to receive at least a part of the soil mixture discharged from the floatation apparatus and swirl substances contained in the received soil mixture to sort the substances depending on a particle size; and a desilter configured to receive at least a part of the soil mixture discharged from the floatation apparatus and swirl substances contained in the received soil mixture at a higher angular velocity than an angular velocity in the hydro-cyclone apparatus to sort the substances depending on a particle size.

The drum mixer apparatus may include a rotary drum provided with a blade, and a driving motor configured to drive at least one of the rotary drum and the blade. The contaminated soil may be mixed with the diluent, the saturated steam and the hot water by rotating at least one of the blade and the rotary drum.

The floatation apparatus may include a conditioner cell and a floatation cell. The conditioner cell and the floatation cell may be disposed so that the soil mixture sequentially passes through the conditioner cell and the floatation cell. The chemical agent for generating bubbles may be supplied to the conditioner cell and the air is supplied to the floatation cell by a blower.

The hydro-cyclone apparatus may include a cyclone body including a feed inlet through which the soil mixture discharged from the floatation apparatus is introduced, an overflow outlet and an underflow outlet respectively. A part of the soil mixture introduced into the cyclone body may be discharged through the overflow outlet. The remainder of the soil mixture introduced into the cyclone body may be discharged through the underflow outlet. The soil mixture discharged through the overflow outlet may be smaller in size than the soil mixture discharged through the underflow outlet.

The desilter may include a desilter body. The desilter body may include a desilter feed inlet through which the soil mixture discharged from the floatation apparatus is introduced, a desilter overflow outlet and a desilter underflow outlet. A part of the soil mixture introduced into the desilter body may be discharged through the desilter overflow outlet. The remainder of the soil mixture introduced into the desilter body may be discharged through the desilter underflow outlet. The soil mixture discharged through the desilter overflow outlet may be smaller in size than the soil mixture discharged through the desilter underflow outlet.

The first vibratory screen of the first screen apparatus may include a first internal screen and a second internal screen. Each of the first internal screen and the second internal screen may include a sieve. The first internal screen and the second internal screen may be spaced apart from each other by a predetermined distance. The sieve of the first internal screen may be larger in sieve opening size than the sieve of the second internal screen.

The impeller of the scrubbing apparatus may include a first impeller and a second impeller provided inside the mixing container. The first impeller and the second impeller may be provided in pair. The first impeller and the second impeller may be configured to cause the soil mixture to flow in opposite directions.

The scrubbing apparatus may include: a first attrition scrubber including the mixing container and the impeller configured to rotate to apply a shear force to the soil mixture introduced into the mixing container; a centrifugal separator provided on a downstream side of the first attrition scrubber; and a second attrition scrubber connected to the first attrition scrubber and the centrifugal separator. The soil mixture passing through the first attrition scrubber may be supplied to at least one of the second attrition scrubber and the centrifugal separator. The soil mixture passing through the centrifugal separator may be supplied to the second attrition scrubber.

The centrifugal separator may be configured to receive the soil mixture passing through the first attrition scrubber, remove a clay component from the soil mixture passing through the first attrition scrubber, and transfer the soil mixture, from which the clay component is removed, to the second attrition scrubber.

The second vibratory screen of the second screen apparatus may include a first internal screen and a second internal screen. Each of the first internal screen and the second internal screen of the second screen apparatus may include a sieve. The first internal screen and the second internal screen of the second screen apparatus may be spaced apart from each other by a predetermined distance. The sieve of the first internal screen of the second screen apparatus may be smaller in sieve opening size than the sieve of the second internal screen of the first screen apparatus. The sieve of the second internal screen of the second screen apparatus may be smaller in sieve opening size than the sieve of the first internal screen of the second screen apparatus.

The floatation apparatus may be configured to sort the soil mixture into a first soil mixture containing bubbles and a second soil mixture containing a smaller amount of bubbles than the first soil mixture.

The floatation apparatus may include a froth tank and a pre-treatment soil tank. The floatation apparatus may be configured to feed the first soil mixture to the froth tank and feed the second soil mixture to the pre-treatment soil tank.

The conditioner cell may be configured to discharge a part of the soil mixture to the floatation cell and discharge the remainder of the soil mixture.

The soil remediation facility may further include an oversize soil clod treatment apparatus, wherein the oversize soil clod treatment apparatus includes an oversize soil clod treatment drum and a third screen apparatus, and the oversize soil clod treatment apparatus is configured to cause oversize soil clod separated in the first screen apparatus to sequentially pass through the oversize soil clod treatment drum and the third screen apparatus.

The floatation apparatus may further include a froth tank and a pre-treatment soil tank, and the floatation apparatus may be configured to feed the bubbles generated in the conditioner cell and the floatation cell to the froth tank and feed the soil mixture discharged from the floatation cell to the pre-treatment soil tank.

In accordance with a second aspect of the present disclosure, there is provided a soil remediation method, including: a first screen step of causing contaminated soil to pass through a first vibratory screen of a first screen apparatus and separating oversize soil clod from the contaminated soil; a mixing step of supplying the contaminated soil passed through the first screen apparatus to a drum mixer apparatus and mixing the contaminated soil with a diluent, a saturated steam and hot water; a scrubbing step of supplying the soil mixture to a scrubbing apparatus and applying a shear force to the soil mixture by rotating at least one of a mixing container and an impeller provided in the scrubbing apparatus; a second screen step of separating cleaned relatively large size of soil particles from the soil mixture produced in the scrubbing step by allowing small particles and contaminants to pass through a second screen apparatus; a floating step of transferring the soil mixture from the scrubbing apparatus to a floatation apparatus, adding a chemical agent for generating bubbles to the soil mixture transferred to the floatation apparatus, injecting air into the soil mixture, and causing contaminants desorbed from the soil mixture to float; a hydro-cyclone step of transferring at least a part of the soil mixture discharged from the floatation apparatus to a hydro-cyclone apparatus, swirling substances contained in the soil mixture transferred to the hydro-cyclone apparatus, and sorting the substances depending on a particle size; and a desilter step of transferring at least a part of the soil mixture discharged from the floatation apparatus to a desilter, swirling substances contained in the soil mixture transferred to the desilter at a higher angular velocity than an angular velocity in the hydro-cyclone apparatus, and sorting the substances depending on a particle size.

In the mixing step, the contaminated soil may be mixed with the diluent, the saturated steam and the hot water by rotating at least one of a blade and rotary drum of the drum mixer apparatus.

The floatation step may include the soil mixture transferred to the floatation apparatus sequentially through a conditioner cell and a floatation cell of the floatation apparatus, and supplying the chemical agent for generating bubbles to the conditioner cell and supplying the air to the floatation cell by a blower.

The hydro-cyclone step may include discharging a part of the soil mixture introduced into a cyclone body of the hydro-cyclone apparatus through an overflow outlet of the cyclone body, and discharging the remainder of the soil mixture introduced into the cyclone body through an underflow outlet of the cyclone body, wherein the soil mixture discharged through the overflow outlet is smaller in size than the soil mixture discharged through the underflow outlet.

The soil remediation method may further include discharging a part of the soil mixture introduced into a desilter body of the desilter through a desilter overflow outlet of the desilter body, and discharging the remainder of the soil mixture introduced into the desilter body through a desilter underflow outlet of the desilter body, wherein the soil mixture discharged through the desilter overflow outlet is smaller in size than the soil mixture discharged through the desilter underflow outlet.

DETAILED DESCRIPTION

Specific embodiments for embodying the concept of the present disclosure will now be described in detail with reference to the drawings.

In the description of the present disclosure, when it is determined that the detailed description of the related well-known configurations or functions may make obscure the gist of the present disclosure, the detailed description thereof will be omitted.

Figure 1:
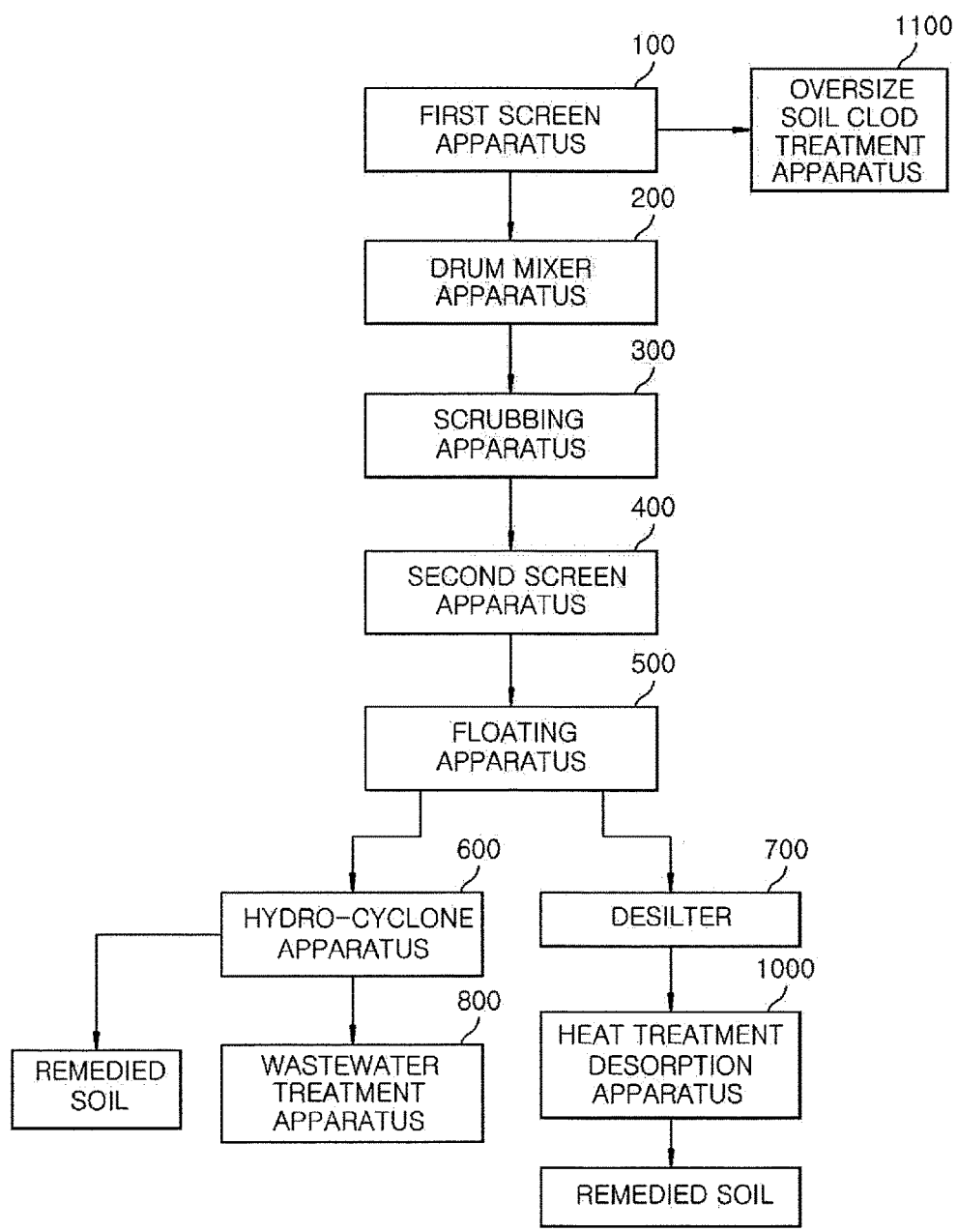
FIG. 1 is a flowchart showing a method of remedying soil through the use of a soil remediation facility according to one embodiment of the present disclosure.

Hereinafter, a soil remediation facility according to one embodiment of the present disclosure will be described with respect to FIG. 1. FIG. 1 is a flowchart showing a method of remedying soil through the use of a soil remediation facility according to one embodiment of the present disclosure.

The soil remediation facility 10 according to one embodiment of the present disclosure may receive soil (contaminated soil) contaminated with heavy oil or crude oil having a carbon number of about 35 or more and may generate remedied soil by removing heavy oil or crude oil from the contaminated soil.

In the present embodiment, description will be made on an example in which the soil remediation facility 10 is supplied with contaminated soil contaminated with heavy oil or crude oil. However, the present disclosure is not limited thereto. For example, the soil remediation facility 10 may be supplied with contaminated soil contaminated with other types of oil as well as heavy oil or crude oil.

In the present embodiment, there is illustrated a case where contaminated soil and a substance mixed with/separated from the contaminated soil are conveyed through a path provided with a pump and a valve or through a conveyor belt. However, this is nothing more than one example. The present disclosure is not necessarily limited thereto.

The driving of the pump and the valve and the driving of the conveyor belt may be controlled by one or more control units (not shown). In addition, the behavior of a driving unit described below may be controlled by one or more control units. The control units control the conveyance of contaminated soil and a substance mixed with/separated from the contaminated soil, the operation speeds of respective apparatuses, and the like. Each of the control units may be, for example, one or more of a P controller, a PI controller and a PID controller, and may be implemented by a computing device including a microprocessor.

Referring to FIG. 1, the soil remediation facility 10 includes a first screen apparatus 100, a drum mixer apparatus 200, a scrubbing apparatus 300, a second screen apparatus 400, a floatation apparatus 500, a hydro-cyclone apparatus 600, a desilter 700, a wastewater treatment apparatus 800, a heat treatment desorption apparatus 1000 and an oversize soil clod treatment apparatus 1100.

Figure 2:
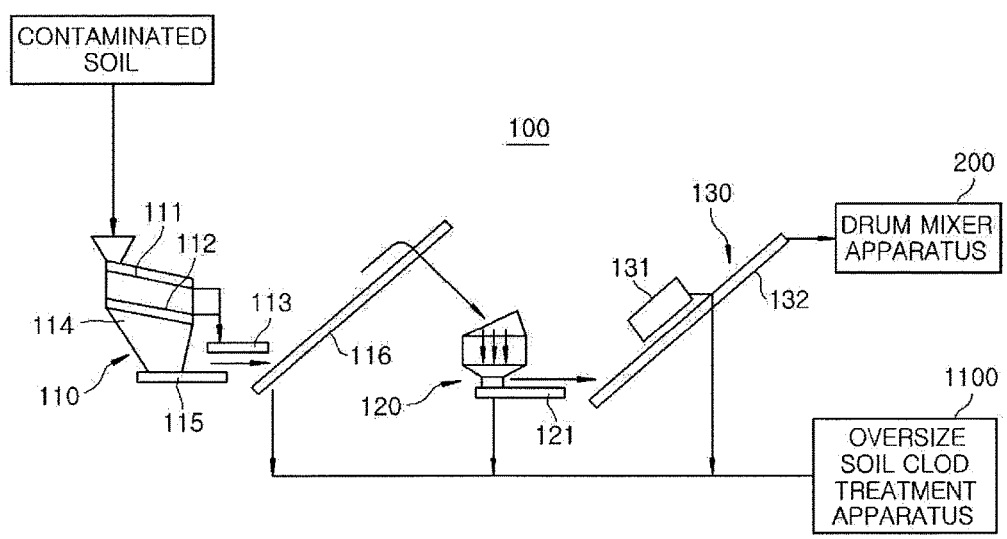
FIG. 2 is a conceptual diagram showing a first screen apparatus.

Hereinafter, the first screen apparatus 100 of the soil remediation facility 10 will be described with reference to FIG. 2. FIG. 2 is a conceptual diagram showing the first screen apparatus.

Referring to FIG. 2, the first screen apparatus 100 includes an upstream screen device 110, a downstream screen device 120 and a magnetic separation device 130. The first screen apparatus 100 performs a first screening process of separating oversize soil clods from contaminated soil by allowing the contaminated soil to pass through a screen.

The upstream screen device 110 may include a vibratory screen including a first internal screen 111 and a second internal screen 112, a first soil clod conveyor 113, a shock-absorbing hopper 114 and an upstream screen conveyor 115.

The vibratory screen of the upstream screen device 110 may include a sieve. For example, the vibratory screen may be a double screen which includes a first internal screen 111 composed of a sieve having a sieve opening size of 20 mm×20 mm and a second internal screen 112 composed of a sieve having a sieve opening size of 7 mm×7 mm. The first internal screen 111 and the second internal screen 112 may be overlappingly disposed with a predetermined gap left therebetween. The oversize soil clods separated from the main stream of contaminated soil by the vibratory screen is discharged by the first soil clod conveyor 113. As used herein, the term "oversize soil clods" refers to soil clods filtered by the screen and does not limit the size of soil clods.

The shock-absorbing hopper 114 is provided below the vibratory screen and is configured to maintain the flow of contaminated soil. The contaminated soil, from which the oversize soil clods are separated, passes through the shock-absorbing hopper 114 and reaches the upstream screen conveyor 115.

The upstream screen conveyor 115 discharges the contaminated soil to a feeding conveyor 116. The feeding conveyor 116 feeds the contaminated soil discharged from the upstream screen device 110 to the downstream screen device 120. The upstream screen conveyor 115 and/or the feeding conveyor 116 may be driven by a variable cycle motor. The supply speed of the contaminated soil supplied to the downstream screen device 120 may be changed depending on the change in the speed of the variable cycle motor.

The downstream screen device 120 may include a bar screen. The oversize soil clods separated from the main stream of contaminated soil by the downstream screen device 120 are discharged to the outside of the downstream screen device 120. In order to discharge the oversize soil clods, a conveyor may be provided in the downstream screen device 120. A conveyor device 121 driven by a variable cycle motor is provided at the outlet side of the downstream screen device 120. The supply speed of the contaminated soil supplied to the downstream side of the downstream screen device 120 may vary depending on the state of the soil remediation facility 10. The conveyor device 121 of the downstream screen device 120 may include a belt conveyor.

The magnetic separation device 130 may include a magnetic force generation device 131 and a conveyor belt 132. While the contaminated soil is conveyed by the conveyor belt 132, the magnetic force generation device 131 may separate residual metallic impurities from the main stream of the contaminated soil.

The first screen apparatus 100 prevents the load of the oversize soil clods, thereby protecting the devices provided at the downstream side of the first screen apparatus 100 and enhancing the efficiency of the soil remediation facility 10.

The contaminated soil, from which the oversize soil clods are removed by the first screen apparatus 100, is conveyed to the drum mixer apparatus 200. The oversize soil clods are conveyed to the oversize soil clod treatment apparatus 1100.

Figure 3:
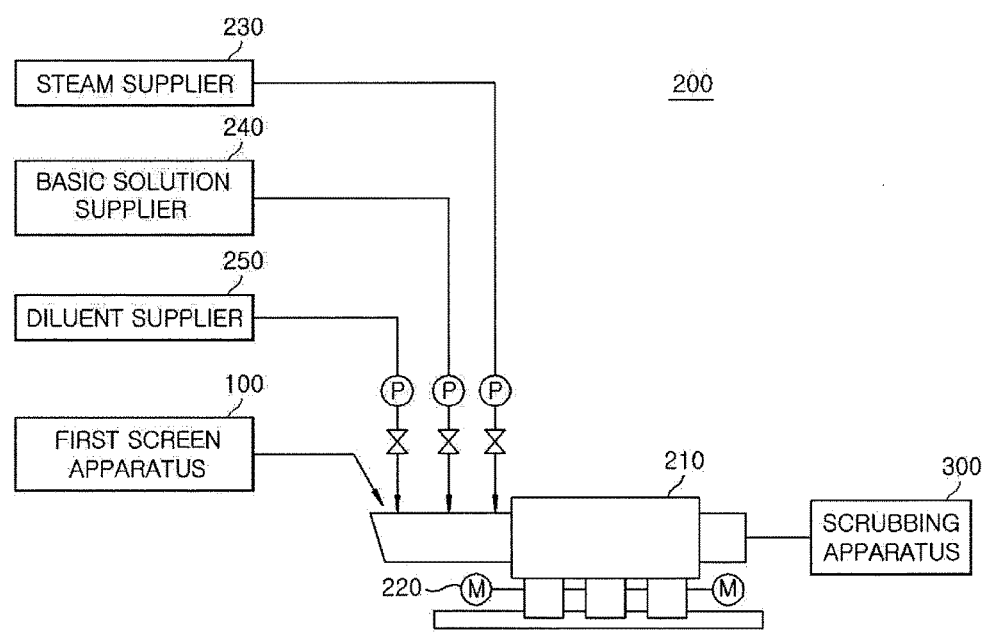
FIG. 3 is a conceptual diagram showing a drum mixer apparatus.

Hereinafter, the drum mixer apparatus 200 will be described with reference to FIG. 3. FIG. 3 is a conceptual diagram showing the drum mixer apparatus.

Referring to FIG. 3, the drum mixer apparatus 200 may include a rotary drum 210 and a driving motor 220. The drum mixer apparatus 200 may include separate supply devices for supplying a diluent, a basic solution, a saturated steam and high temperature water, for example, a steam supplier 230, a basic solution supplier 240, a diluent supplier 250, and the like.

The rotary drum 210 may be horizontally disposed and may include a blade (not shown) installed therein. The contaminated soil is mixed with a diluent, a basic solution, a saturated steam and high temperature water (into a soil mixture) in the rotary drum 210. The soil mixture goes through a liberation process in the rotary drum 210. As used herein, the term "liberation" unit that heavy oil or crude oil adsorbed to soil grains is physically or chemically desorbed and separated from the surfaces of the soil grains. In such a drum mixer process, the drum mixer apparatus 200 liberates oil components from the soil particles. Thus, in the drum mixer apparatus 200, the ratio of the soil particles covered with oil components to the soil mixture may be reduced.

The driving motor 220 is configured to rotate the rotary drum 210 and/or the blade. By the rotation of the rotary drum 210 and/or the blade, the contaminated soil can be well mixed with the diluent, the high temperature water and the saturated steam. The rotational speed of the rotary drum 210 and the blade may be determined depending on the physical and chemical characteristics such as the type of the diluent, the ratio of the contaminated soil to the diluent, the internal temperature of the rotary drum, the particle size of the contaminated soil and the like. As an example, the rotary drum 210 may be configured to have a volume of 45 $m^3$. The rotary drum 210 and the blade may be driven at a constant speed for, e.g., a time period of 4.5 minutes.

The diluent may be light oil, gasoline, diesel, kerosene, isopropyl alcohol, benzene, toluene, mineral oil, etc. In addition, the diluent may be oil having a carbon number of a predetermined range, for example, oil having a carbon number of 35 or less.

The basic solution and the diluent help to effectively separate the heavy oil or crude oil adsorbed to soil grains from the contaminated soil. The basic solution helps to make sure that the heavy oil or crude oil adsorbed to soil grains is well mixed with the water. The basic solution may be, for example, NaOH. However, the basic solution is not limited thereto.

The high temperature water and the saturated steam may keep high the temperature of the soil mixture in the drum mixer apparatus 200. By keeping high the temperature of the soil mixture, it is possible to secure the fluidity of the soil mixture and to reduce the viscosity of the oil contaminant and soil mixture.

Figure 4:
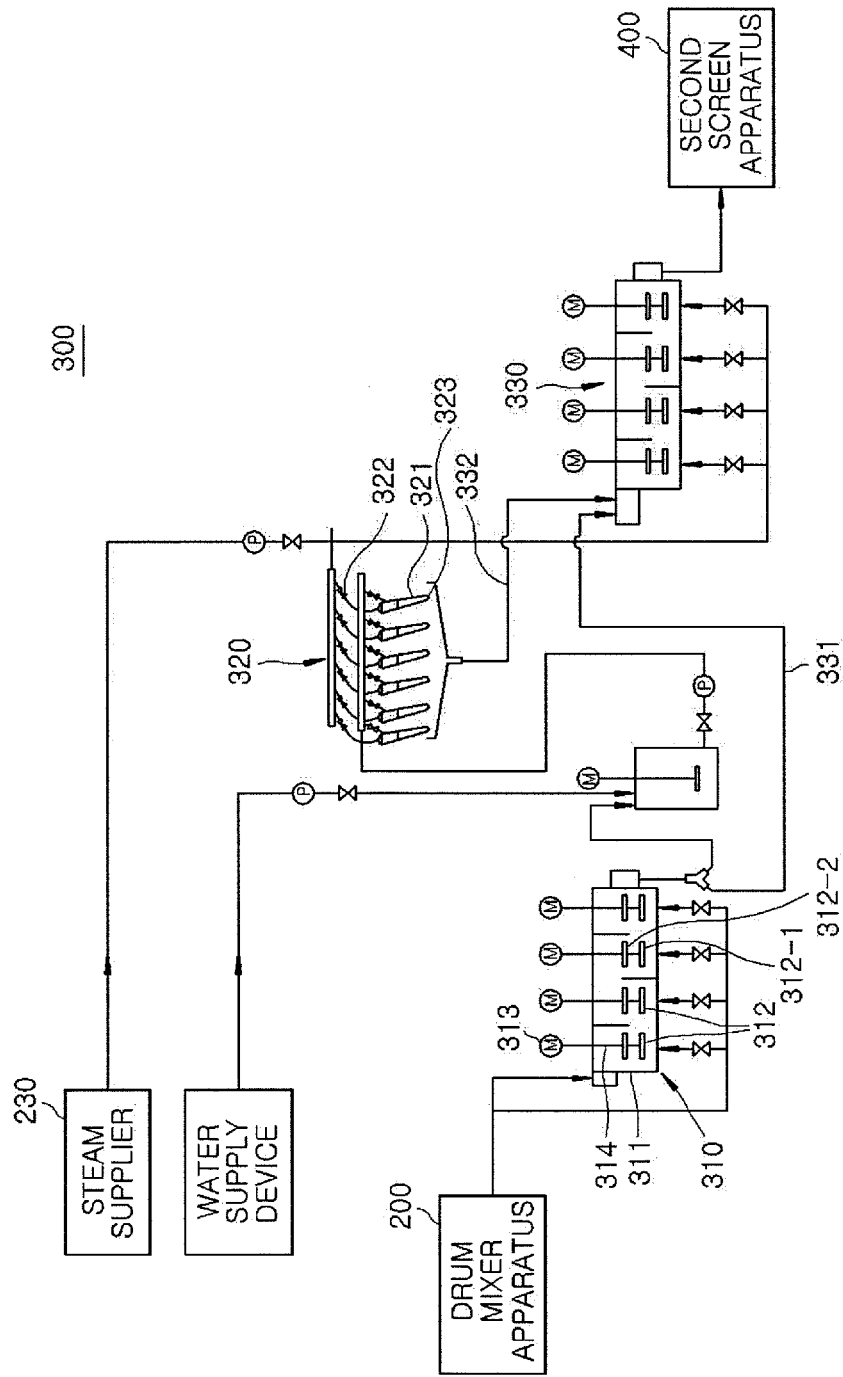
FIG. 4 is a conceptual diagram showing a scrubbing apparatus.

The contaminated soil passing through the drum mixer apparatus 200 is moved to the scrubbing apparatus 300. Hereinafter, the scrubbing apparatus 300 will be described with reference to FIG. 4. FIG. 4 is a conceptual diagram showing the scrubbing apparatus.

Referring to FIG. 4, the scrubbing apparatus 300 is configured to perform a scrubbing process of applying a shear force to the soil mixture. The scrubbing apparatus 300 may include a first attrition scrubber 310, a second attrition scrubber 330 and a centrifugal separator 320. The temperature of the soil mixture introduced into the scrubbing apparatus 300 is 90° C. or less.

The first attrition scrubber 310 may perform a first attrition scrubbing process of liberating contaminants from the surface of soil particles in the soil mixture. In this way, oil is liberated from the surface of soil particles in the soil mixture in the first attrition scrubber 310. Thus, in the first attrition scrubber 310, the ratio of the soil particles covered with oil to the soil mixture may be further reduced.

The first attrition scrubber 310 includes a mixing container 311, an impeller 312, an impeller driving unit 313 and an impeller shaft 314. The impeller driving unit 313 is configured to apply a driving force to the impeller 312 and may be, for example, a motor. The impeller 312 is provided inside the mixing container 311. There may be provided two or more impellers 312.

For example, the impeller 312 may include a first impeller 312-1 and a second impeller 312-2 producing soil mixture streams in opposite directions to each other. There may be provided plural pairs of the first impeller 312-1 and the second impeller 312-2. Each pair of the first impeller 312-1 and the second impeller 312-2 may be connected to the impeller shaft 314 and the driving unit 313. Referring to FIG. 4, the first impeller 312-1 has a blade formed to move the soil mixture upward. The second impeller 312-2 has a blade formed to move the soil mixture downward.

The soil mixture introduced into the first attrition scrubber 310 receives an external force, for example, a shear force, as the impeller 312 rotates. The soil mixture may be divided into small clods by the external force in the mixing container 311. The contaminated soil failed to react with the diluent and the basic solution in the drum mixer apparatus 200 are caused to react with the diluent and the basic solution in the scrubbing apparatus 300.

Contaminants having a high viscosity, for example, highly weathered petro-hydrocarbon matters may be separated from the contaminated soil by the external force applied by the impeller 312.

The soil mixture discharged from the first attrition scrubber 310 is conveyed to the centrifugal separator 320 and/or the second attrition scrubber 330.

The centrifugal separator 320 may receive the soil mixture primarily treated from the first attrition scrubber 310. The soil mixture discharged from the first attrition scrubber 310 may be containing large amounts of clay particles having a relatively small particle size in the soil mixture. When the large amount of clay particles in the soil mixture is introduced into the second attrition scrubber 330, an abrasion action in the second attrition scrubber 330 may be hindered by the clay. The centrifugal separator 320 may remove clay components from the soil mixture before the soil mixture is supplied to the second attrition scrubber 330. In other words, the soil mixture may go through a clay component removal process of removing clay components from the soil mixture, between a first attrition scrubbing process performed in the first attrition scrubber 310 and a second attrition scrubbing process performed in the second attrition scrubber 330. The soil mixture discharged from the first attrition scrubber 310 passes through the centrifugal separator 320. It is therefore possible to effectively separate clay components in the second attrition scrubber 330. The centrifugal separator 320 may be, for example, a hydro-cyclone apparatus. However, the centrifugal separator 320 is not necessarily limited thereto.

The centrifugal separator 320 may include at least one separator body 321, having an upper cylindrical part and a lower conical part, and a rotational driving device (not shown). The separator body 321 may include an overflow outlet 322 and an underflow outlet 323. The soil mixture conveyed from the first attrition scrubber 310 is introduced into the separator body 321. The soil mixture receives a centrifugal force as the separator body 321 rotates. Relatively small particles in the soil mixture are discharged through the overflow outlet 322. Relatively large particles in the soil mixture are discharged through the underflow outlet 323. The small particles discharged through the overflow outlet 322 may be transferred to the second screen apparatus 400. The large particles discharged through the underflow outlet 323 may be transferred to the second attrition scrubber 330.

The first outflow port 322 may be provided in the upper portion of the rotary chamber 321. The second outflow port 323 may be provided in the lower portion of the rotary chamber 321. The rotary chamber 321 may include a separate rotary unit (not shown) in addition to these components. The rotary chamber 321 may separate the soil mixture through the rotation of the rotary unit. A pressurizing pump may pressurize the soil mixture supplied to the rotary chamber 321. The soil mixture may be introduced in the tangential direction of the rotary chamber 321. The soil mixture is moved down toward the lower portion of the rotary chamber 321 while making a swirling movement.

The second attrition scrubber 330 receives the soil mixture discharged from the first attrition scrubber 310 and the soil mixture discharged from the centrifugal separator 320. The second attrition scrubber 330 may perform a second attrition scrubbing process of liberating contaminants from the surface of soil particles in the soil mixture. In the second attrition scrubber 330, oil is liberated from the surface of soil particles in the soil mixture. Thus, in the second attrition scrubber 330, the ratio of soil particles covered with oil to the soil mixture may be further reduced. The second attrition scrubber 330 may be connected to the first attrition scrubber 310 via a bypass path 331 without going through the centrifugal separator 320. Furthermore, the second attrition scrubber 330 may be connected to the centrifugal separator 320 via a centrifugal separator path 332. The centrifugal separator 320 may have same or similar mechanism with the hydro-cyclone 600 and the desilter 700.

The specific configuration of the second attrition scrubber 330 is the same as that of the first attrition scrubber 310. Thus, as for the detailed description of the second attrition scrubber 330, the description on the first attrition scrubber 310 is incorporated herein by reference.

Figure 5:
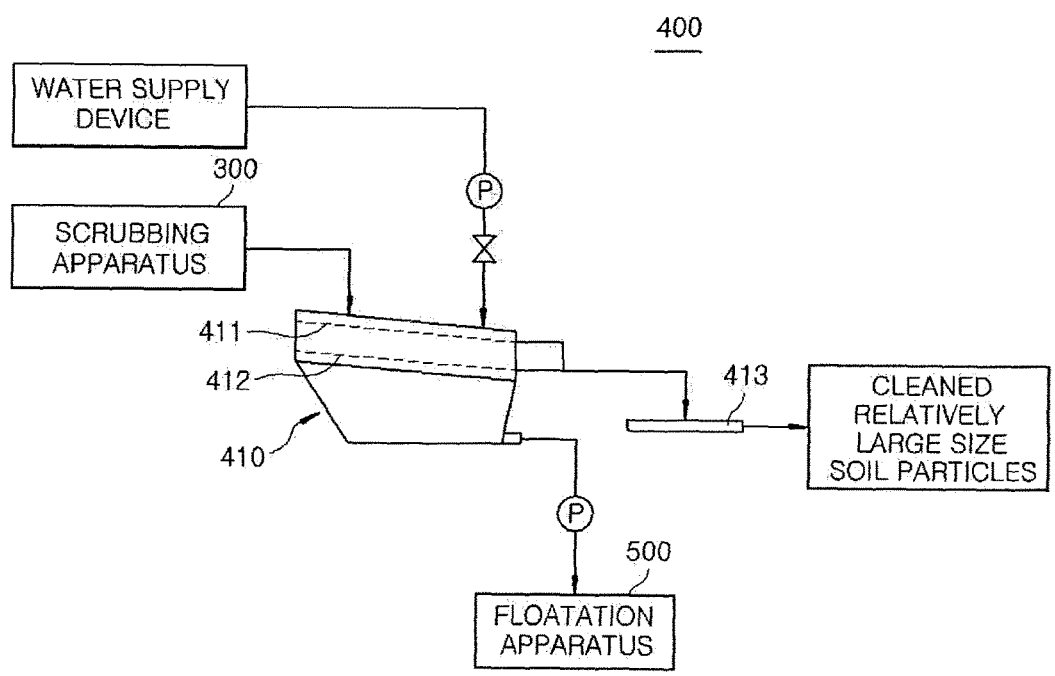
FIG. 5 is a conceptual diagram showing a second screen apparatus.

The contaminated soil passing through the scrubbing apparatus 300 is conveyed to the second screen apparatus 400. Hereinafter, the second screen apparatus 400 will be described with reference to FIG. 5. FIG. 5 is a conceptual diagram showing the second screen apparatus.

Referring to FIG. 5, the second screen apparatus 400 performs a second screening process of separating cleaned relatively large size soil particles from the soil mixture by allowing small particles and contaminants to pass through a screen. The second screen apparatus 400 may include a second vibratory screen 410. The second vibratory screen 410 may include a sieve. The sieve opening of the second vibratory screen 410 of the second screen apparatus 400 may be formed to become smaller than the sieve opening of the first vibratory screen of the first screen apparatus 100. For example, the second vibratory screen 410 may be a double screen which includes a first internal screen 411 composed of a sieve having a sieve opening size of 5 mm×5 mm and a second internal screen 412 composed of a sieve having a sieve opening size of 2 mm×2 mm. However, the sieve opening sizes of the first internal screen 411 and the second internal screen 412 are not necessarily limited thereto and may be adjusted to sieve opening size suitable for an introduced soil condition. The first internal screen 411 and the second internal screen 412 may be overlappingly disposed with a predetermined gap left therebetween. The sieve provided in the screen may be made of polyurethane or metal wire mesh (Hybrid Type) so as to have a superior wear resistance and a superior corrosion resistance.

By the second screen apparatus 400, cleaned relatively large size soil particles are separated from the contaminated soil mixture treated in the attrition scrubbers 310 and 320. The cleaned relatively large size soil particles are discharged by a conveyor 413. The cleaned soil thus separated and discharged is conveyed to a stock area for to storage and further transportation and final restoration. The contaminated soil mixture passing through the second vibratory screen 410 is fed to the floatation apparatus 500 by a pump.

Figure 6:
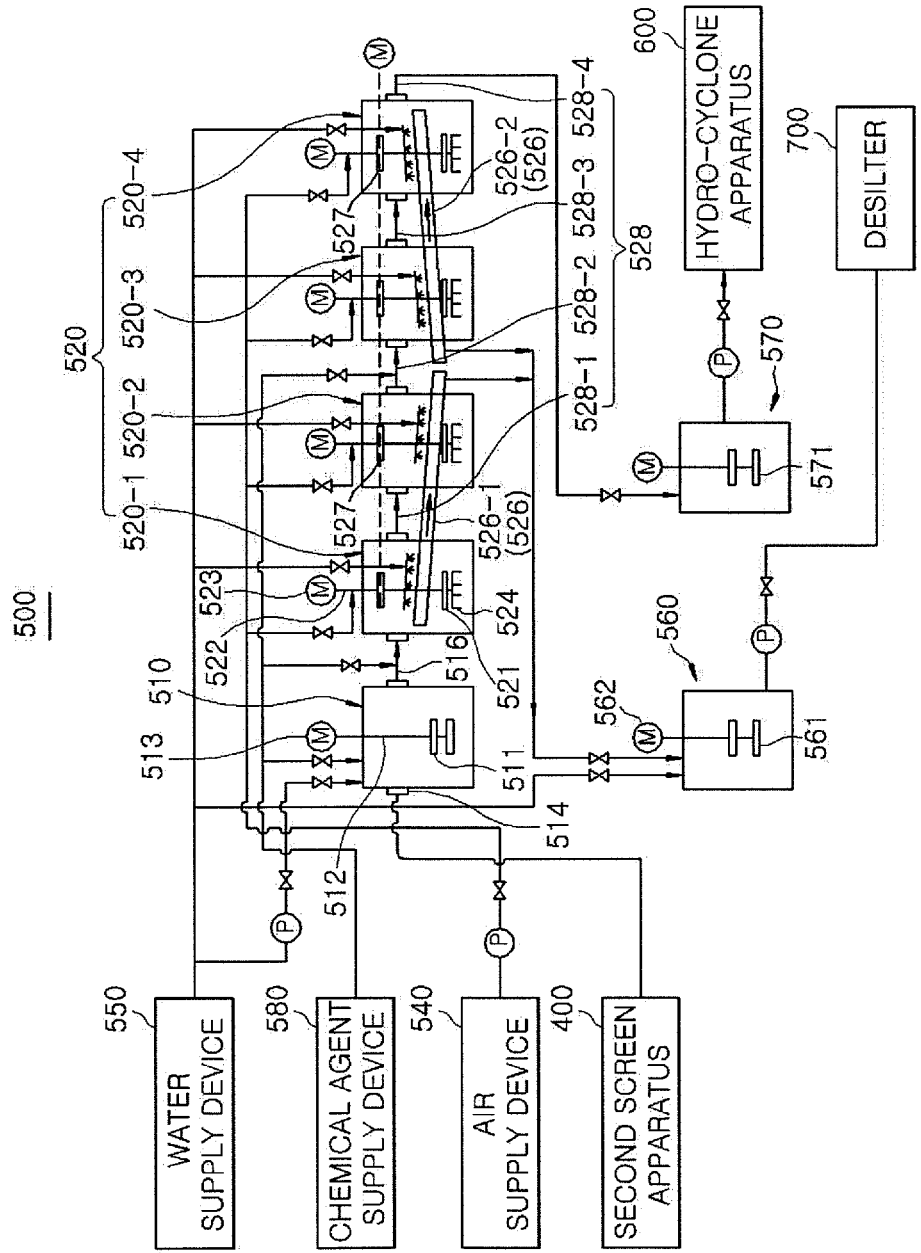
FIG. 6 is a conceptual diagram showing a floatation apparatus.

Hereinafter, the floatation apparatus 500 will be described with reference to FIG. 6. FIG. 6 is a conceptual diagram showing the floatation apparatus.

Referring to FIG. 6, the floatation apparatus 500 includes a conditioner cell 510, a floatation cell 520, an air supply device 540, a water supply device 550, a chemical agent supply device 580, a froth tank 560 and a pre-treatment soil tank 570. The floatation apparatus 500 receives the soil mixture from the second screen apparatus 400. For example, the soil mixture may be introduced from the second screen apparatus 400 into the conditioner cell 510 of the floatation apparatus 500. The floatation apparatus 500 is configured to separate the soil mixture. In other words, by the air bubbles generated in the floatation apparatus 500, the soil mixture may be divided into a floating first soil mixture and a non-floating second soil mixture.

The conditioner cell 510 may include a conditioner cell inflow port 514 through which the soil mixture is introduced, and a conditioner cell outflow path 516. The conditioner cell 510 may receive water and a chemical agent from the water supply device 550 and the chemical agent supply device 580. The chemical agent may perform an action of helping to generate bubbles having a constant size, preventing the bubbles from being coalesced into large bubbles and helping to maintain the bubbles on a water surface without being broken. The chemical agent may be, for example, a frother including one or more of aliphatic alcohols, cyclic alcohols, alkoxy paraffins, polypropylene glycol ethers, polyglycol ethers and polyglycol glycerol ethers.

In the conditioner cell 510, it is expected that the soil mixture and the chemical agent are sufficiently mixed before the soil mixture and the chemical agent are put into the floatation cell 520. In other words, the floating action in the floatation cell 520 may be smoothly performed by the mixing in the conditioner cell 510. For this mixing, an impeller 511 may be provided inside the conditioner cell 510. The impeller 511 may be connected to an impeller driving unit 513, for example, a motor, through a shaft 512 and may be rotated by the impeller driving unit 513. The soil mixture introduced into the conditioner cell 510 is mixed with the water and the chemical agent by the rotation of the impeller 511. In addition, the soil mixture may be applied with a shear force by the rotation of the impeller 511 and contaminants may be further liberated from the soil particles.

The water, the chemical agent and the air naturally dissolved in the water in the conditioner cell 510 generate bubbles in the soil mixture even though there is no blower. Oil components and contaminant particles in the soil adhere to the bubbles. The oil components and the contaminant particles are desorbed from the soil mixture by the bubbles. The bubbles may be generated in a large amount to form a layer (froth layer). The soil mixture introduced into the conditioner cell 510 and the froth layer generated in the conditioner cell 510 are discharged to the floatation cell 520 via the conditioner cell outflow path 516.

The floatation cell 520 receives the soil mixture from the conditioner cell 510. The soil mixture introduced into the floatation cell 520 may contain, in addition to additives, 1) soil particles separated from oil, 2) relatively small soil particles not separated from oil, 3) relatively large soil particles not separated from oil, and 4) separated oil. In the floatation cell 520, an actual floating action of contaminants is performed. Due to the floating action in the floatation cell 520, 2) the relatively small soil particles not separated from oil and 4) the separated oil may be separated from the soil mixture. In other words, the floatation cell 520 performs a function of spatially separating 2) the relatively small soil particles not separated from oil and 4) the separated oil, from 1) the soil particles separated from oil and 3) the relatively large soil particles not separated from oil.

The floatation cell 520 includes a froth discharge path 526 through which the froth layer mainly passes and a soil mixture discharge path 528 through which the soil mixture mainly passes.

The floatation cell 520 may receive the air supplied by the air supply device 540. Furthermore, the floatation cell 520 may additionally receive the water from the water supply device 550. The air supplied to the floatation cell 520 is turned into bubbles by the chemical agent and the water. The bubbles, to which the contaminant particles and the oil components separated from the soil adhered, float above the soil mixture. The bubbles may form a layer (froth layer). However, the soil particles are not completely excluded from the froth layer. In other words, the froth layer may include the chemical agent, the relatively small soil particles not separated from oil, and the oil separated from the soil particles.

The froth layer is discharged to the froth tank 560 via the froth discharge path 526. The soil mixture is discharged via the soil mixture discharge path 528. In order to facilitate the discharge of the froth layer, the froth discharge path 526 of the floatation cell 520 may be disposed above the soil mixture discharge path 528 in the floatation cell 520.

An impeller 521, a stirrer 524, a skimmer 527 and a water spray nozzle may be provided inside the floatation cell 520.

The impeller 521 may be connected to an impeller driving unit 523, for example, a motor, through a shaft 522 and may be rotated by the impeller driving unit 523. The soil mixture introduced into the floatation cell 520 is further mixed with the chemical agent, the water and the air by the rotation of the impeller 521. The rotation of the impeller 521 may apply a shear force to the soil mixture and contaminants may be further liberated from the soil particles. The rotation of the impeller 521 may induce generation of bubbles.

The stirrer 524 causes the soil mixture in the floatation cell 520 to be mixed with the water, the air and the chemical agent. The stirrer 524 may receive power from a driving device. The air delivered from the air supply device 540 is injected into the soil mixture through the shaft 522 and the stirrer 524. Bubbles may be easily generated in the floatation cell 520 by rotatory power of the impeller 521. The bubbles are derived from the injected air with shear force generated between the impeller 521 and a stabilizer (not shown) surrounding the impeller 521. In this circumstance, the size of bubbles becomes smaller. In other words, the stirrer 524 may perform not only a stirring function and bubbles generating function but also an enhancement of additional liberation function is able to be expected as mentioned above.

The skimmer 527 moves the froth layer in the floatation cell 520 toward the froth discharge path 526. The skimmer 527 may be configured to rotate about a rotary shaft extending parallel to a ground surface and may include a driving device for providing a rotational force. The skimmer 527 may be configured just like a waterwheel and may include a paddle. The froth layer moved to the froth discharge path 526 by the skimmer 527 is discharged to the outside along the froth discharge path 526. In the case where there is provided a plurality of floatation cells 520, the skimmers 527 provided in the respective floatation cells 520 may have the same rotary shaft and may be operated by a single driving device.

The water spray nozzle may be connected to the water supply device 550. The water supplied from the water supply device 550 may be pressurized by a pump P and may be discharged through the water spray nozzle. The water supply device 550 supplies water to the conditioner cell 510, the floatation cell 520 and/or the froth tank 560. The water supply device 550 may use the water treated in a wastewater treatment apparatus 800.

There may be provided a plurality of floatation cells 520. The floatation cells 520 may be connected by the soil mixture discharge path 528. For example, as shown in FIG. 6, the floatation cell 520 may include a first floatation cell 520-1, a second floatation cell 520-2, a third floatation cell 520-3 and a fourth floatation cell 520-4. The first floatation cell 520-1 and the second floatation cell 520-2 may be connected by a first soil mixture discharge path 528-1. The second floatation cell 520-2 and the third floatation cell 520-3 may be connected by a second soil mixture discharge path 528-2. The third floatation cell 520-3 and the fourth floatation cell 520-4 may be connected by a third soil mixture discharge path 528-3.

The froth discharge path 526 may be configured to connect at least two of the floatation cells 520. For example, the first floatation cell 520-1 and the second floatation cell 520-2 may be connected by a first froth discharge path 526-1. The first froth discharge path 526-1 may be configured to discharge the froth layer from the first floatation cell 520-1 and the second floatation cell 520-2. Furthermore, the third floatation cell 520-3 and the fourth floatation cell 520-4 may be connected by a second froth discharge path 526-2. The second froth discharge path 526-2 may be configured to discharge the froth layer from the third floatation cell 520-3 and the fourth floatation cell 520-4.

In other words, the froth layer in the first floatation cell 520-1 is moved to the first froth discharge path 526-1 by the skimmer 527 provided inside the first floatation cell 520-1. Thereafter, the froth layer is discharged through the first froth discharge path 526-1 to the froth tank 560. Furthermore, the froth layer in the second floatation cell 520-2 is moved to the first froth discharge path 526-1 by the skimmer 527 provided inside the second floatation cell 520-2. Thereafter, the froth layer is discharged to the froth tank 560 through the first froth discharge path 526-1. The first froth discharge path 526-1 is configured so that the froth layer supplied from the first floatation cell 520-1 does not flow into the second floatation cell 520-2.

Moreover, the froth layer in the fourth floatation cell 520-4 is moved to the second froth discharge path 526-2 by the skimmer 527 provided inside the fourth floatation cell 520-4. Thereafter, the froth layer is discharged through the second froth discharge path 526-2 to the froth tank 560. In addition, the froth layer in the third floatation cell 520-3 is moved to the second froth discharge path 526-2 by the skimmer 527 provided inside the third floatation cell 520-3. Thereafter, the froth layer is discharged to the froth tank 560 through the second froth discharge path 526-2. The second froth discharge path 526-2 is configured so that the froth layer supplied from the fourth floatation cell 520-4 does not flow into the third floatation cell 520-3. The direction of movement of the froth layer along the second froth discharge path 526-2 is opposite to the direction of movement of the soil mixture along the third soil mixture discharge path 528-3.

The froth discharge through the first froth discharge path 526-1 and the froth discharge through the second froth discharge path 526-2 may be performed between the second floatation cell 520-2 and the third floatation cell 520-3.

The second floatation cell 520-2 receives an air from the air supply device 540 and receives water from the water supply device 550. The impeller provided inside the second floatation cell 520-2 causes the soil mixture to be mixed with the air and the water, whereby bubbles are additionally generated in the second floatation cell 520-2. The oil components and contaminant particles which has not been separated from the soil mixture in the first floatation cell 520-1 may adhere to the bubbles generated in the second floatation cell 520-2. The bubbles in the second floatation cell 520-2 are discharged to the outside via the first froth discharge path 526-1 and are delivered to the froth tank 560. Further, the soil mixture in the second floatation cell 520-2 is moved to the third floatation cell 520-3 via the second soil mixture discharge path 528-2. A chemical agent may be additionally supplied when the soil mixture is moved from the second floatation cell 520-2 to the third floatation cell 520-3.

The third floatation cell 520-3 receives an air from the air supply device 540 and receives water from the water supply device 550. The impeller provided inside the third floatation cell 520-3 causes the soil mixture to be mixed with the air and the water, whereby bubbles are additionally generated in the third floatation cell 520-3. The oil components and contaminant particles which has not been separated from the soil mixture in the first and second floatation cells 520-1 and 520-2 may adhere to the bubbles generated in the third floatation cell 520-3. The bubbles in the third floatation cell 520-3 are discharged to the outside via the second froth discharge path 526-2 and are delivered to the froth tank 560. Furthermore, the soil mixture in the third floatation cell 520-3 is moved to the fourth floatation cell 520-4 via the third soil mixture discharge path 528-3.

The fourth floatation cell 520-4 receives an air from the air supply device 540 and receives water from the water supply device 550. The impeller provided inside the fourth floatation cell 520-4 causes the soil mixture to be mixed with the air and the water, whereby bubbles are additionally generated in the fourth floatation cell 520-4. The oil components and contaminant particles which has not been separated from the soil mixture in the first to third floatation cells 520-1 to 520-3 may adhere to the bubbles generated in the fourth floatation cell 520-4. The bubbles in the fourth floatation cell 520-4 are discharged to the outside via the second froth discharge path 526-2 and are delivered to the froth tank 560. Furthermore, the soil mixture in the fourth floatation cell 520-4 is discharged to the pre-treatment soil tank 570 via the fourth soil mixture discharge path 528-4.

The froth tank 560 includes a froth tank impeller 561 and a froth tank impeller driving unit 562. In addition to the bubbles, 2) the relatively small soil particles not separated from oil and 4) the oil separated from the soil mixture are introduced into the froth tank 560. Furthermore, the froth tank 560 may receive water from the water supply device 550. The froth tank impeller 561 mixes the water, the bubbles, the fine soil particles and the oil components again (to produce a froth mixture). Thereafter, the bubbles in the froth tank 560 are broken as the time is elapsed.

Then, the froth mixture in the froth tank 560 is delivered to the desilter 700. The froth tank 560 may receive the relatively small soil particles not separated from oil and the oil separated from the soil mixture, from the floatation cell 520, and may cause the bubbles to be broken in the separated soil mixture. The froth tank 560 may feed the froth-removed soil mixture to the desilter 700. The pre-treatment soil tank 570 receives the soil mixture from the floatation cell 520. The soil mixture contains most of 1) the soil particles separated from oil and 3) the relatively large soil particles not separated from oil, and may also contain small amount of 2) the relatively small soil particles not separated from oil and 4) the oil separated from the soil mixture. The pre-treatment soil tank 570 may serve as a buffer tank for sending the soil mixture to a post-treatment step. The post-treatment step may be performed in the hydro-cyclone apparatus 600 to be described later.

Furthermore, the pre-treatment soil tank 570 includes a soil tank impeller 571 and a soil tank impeller driving unit 572. The pre-treatment soil tank 570 receives the soil mixture and the water discharged from the floatation cell 520. The soil mixture may be mixed with the water by the soil tank impeller 571.

The chemical agent supply device 580 may supply a selective chemical agent, for example, frother (trademark), to the conditioner cell 510. The chemical agent may generate bubbles for causing contaminants to float. The chemical agent may be, for example, Frother. Fine particles contaminated with oil components may adhere to bubbles generated by the chemical agent and may be separated from the soil.

The chemical agent supply device 580 may supply a chemical agent to the foremost conditioner cell (the first conditioner cell). Furthermore, the chemical agent supply device 580 may selectively supply a chemical agent to one or more of the path between the conditioner cell and the floatation cell and the path between the adjacent floatation cells. For example, the chemical agent supply device 580 may supply a chemical agent to the conditioner cell 510 (the first supply of a chemical agent in the floatation apparatus 500), may supply a chemical agent to the conditioner cell outflow path 516 provided between the conditioner cell 510 and the first floatation cell 520-1 (the second supply of a chemical agent in the floatation apparatus 500), and may supply a chemical agent to the path (second soil mixture discharge path 528-2) between the second floatation cell 520-2 and the third floatation cell 520-3 (the third supply of a chemical agent in the floatation apparatus 500). The amount of the chemical agent supplied to the paths may be appropriately adjusted.

The soil mixture is mixed with the chemical agent in the paths and is then moved through two floatation cells. In other words, the chemical agent is supplied from the conditioner cell outflow path 516 provided between the conditioner cell 510 and the first floatation cell 520-1 and is then moved through the first floatation cell 520-1 and the second floatation cell 520-2. Furthermore, the chemical agent is supplied from the second soil mixture discharge path 528-2 between the second floatation cell 520-2 and the third floatation cell 520-3 and is then moved through the third floatation cell 520-3 and the fourth floatation cell 520-4. This enables the floatation apparatus 500 to effectively generate bubbles in the floatation cell 520 and to effectively remove oil components and contaminant particles from the soil mixture.

The chemical agent supply device 580 may include valves and a control unit for controlling these valves. The supply of a chemical agent in the floatation cell 520 may be controlled by the control unit. For example, the amount of a chemical agent during the second supply of a chemical agent in the floatation cell 520 may be smaller than the amount of a chemical agent during the first supply of a chemical agent in the floatation cell 520.

The floatation apparatus 500 has a liberation function of desorbing contaminants from the surfaces of soil particles in the introduced soil mixture and a separation function of spatially separating contaminants and contaminated fine soil particles from the soil mixture by causing a mixture of desorbed contaminants and contaminated fine soil particles to float.

The soil mixture passing through the pre-treatment soil tank 570 of the floatation apparatus 500 is supplied to the hydro-cyclone apparatus 600. The froth mixture supplied to the froth tank 560 of the floatation apparatus 500 is fed to the desilter 700.

Figure 7:
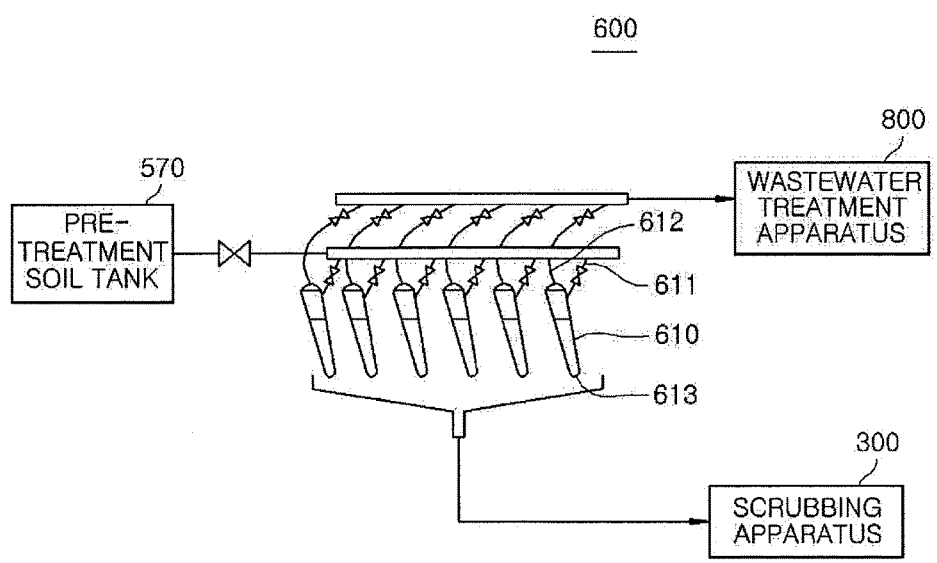
FIG. 7 is a conceptual diagram showing a hydro-cyclone apparatus.
Figure 8:
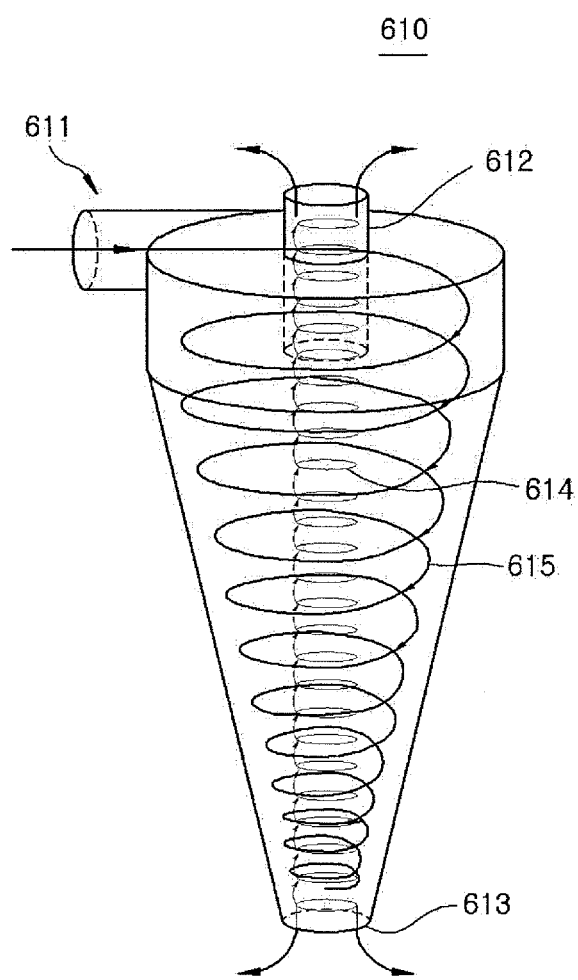
FIG. 8 is a conceptual diagram showing a cyclone body, having an upper cylindrical part and a lower conical part of the hydro-cyclone apparatus.
Figure 9:
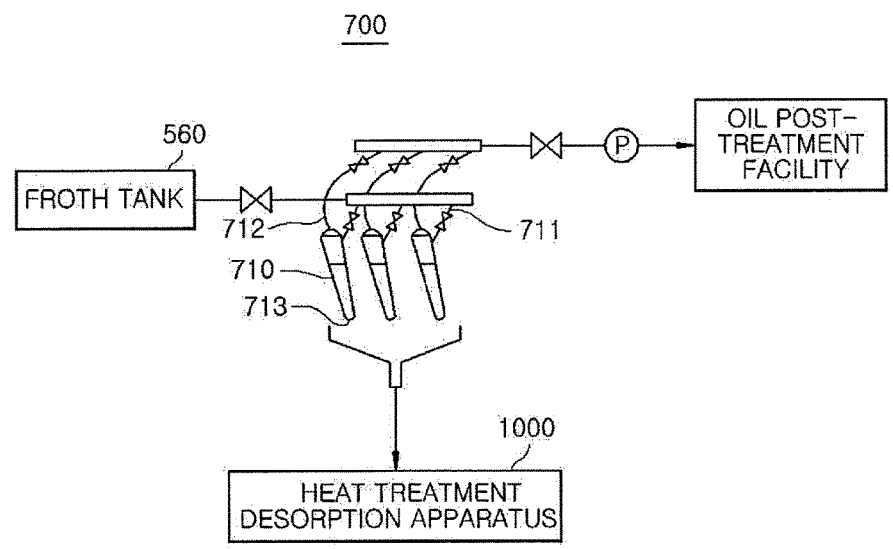
FIG. 9 is a conceptual diagram showing a desilter.

Hereinafter, the hydro-cyclone apparatus 600 and the desilter 700 will be described with reference to FIGS. 7, 8 and 9. FIG. 7 is a conceptual diagram showing the hydro-cyclone apparatus. FIG. 8 is a conceptual diagram showing a cyclone body, having an upper cylindrical part and a lower conical part of the hydro-cyclone apparatus. FIG. 9 is a conceptual diagram showing the desilter.

Referring to FIGS. 7 and 8, the hydro-cyclone apparatus 600 may perform a hydro-cyclone process of sorting the soil mixture received from the floatation apparatus 500, depending on the size and/or mass of the soil particles. The hydro-cyclone apparatus 600 includes at least one cyclone body 610 with upper-cylindrical and lower-conical shape, a pressurization pump (not shown) and a driving unit (not shown) for rotating the cyclone body 610. As an example, the cyclone body 610 may be formed in a substantially conical shape or mixed cylindrical and conical shape. The cyclone body 610 includes an Feed Inlet 611, an overflow outlet 612 and an underflow outlet 613. The overflow outlet 612 may be provided in the upper portion of the cyclone body 610. The underflow outlet 613 may be provided in the lower portion of the cyclone body 610. The body 610 may include a separate rotary unit (not shown) in addition to these components. The cyclone body 610 may separate the soil mixture through the rotation of the rotary unit. The pressurization pump may pressurize the soil mixture supplied to the cyclone body 610. The soil mixture may be introduced in the tangential direction of the cyclone body 610. The soil mixture is moved down toward the lower portion of the cyclone body 610 while making a swirling movement.

When the soil mixture is moved down toward the lower portion of the cyclone body 610, a vortex of the soil mixture is formed in the cyclone body 610, whereby the soil mixture goes through a separation process. As used herein, the term "separation process" unit that the separated oil and the contaminated fine soil particles are spatially separated from the soil mixture. The soil mixture is applied with a centrifugal force by the rotation of the cyclone body 610. By the centrifugal force, the soil mixture is split into a first flow 614 containing relatively small and light particles and a second flow 615 containing fine soil particles, residual oil and water. The first flow 614 containing relatively small and light particles is moved up from the central portion of the cyclone body 610 and is discharged through the overflow outlet 612. The second flow 615 containing relatively large and heavy particles is moved toward the outer wall of the cyclone body 610 by the centrifugal force and is concentrated. The second flow 615 is moved down toward the lower side of the cyclone body 610 and is discharged from the cyclone body 610 through the underflow outlet 613. The overflow outlet 612 of the body 610 is connected to the wastewater treatment apparatus 800. The underflow outlet 613 of the cyclone body 610 is connected to a drain port (not shown) of the soil remediation facility 10.

The hydro-cyclone apparatus 600 is configured to swirl the substances contained in the soil mixture discharged from the floatation apparatus 500 and to separate the substances contained in the soil mixture discharged from the floatation apparatus 500 depending on the size of particles. The soil mixture introduced into the hydro-cyclone apparatus 600 are separated into soil and wastewater. The wastewater is discharged through the overflow outlet 612 and is supplied to the wastewater treatment apparatus 800. The remedied soil treated in the hydro-cyclone apparatus 600 is discharged through the underflow outlet 613. The remedied soil may be supplied to a separate cleaning apparatus and may be cleaned once again.

Referring to FIG. 9, the desilter 700 is provided on the downstream side of the froth tank 560 of the floatation apparatus 500. The froth mixture containing bubbles, fine soil particles and oil components is introduced from the froth tank 560 into the desilter 700. Since the froth mixture contains a considerable amount of fine soil particles and oil components, the desilter 700 performs a desilter process of separating the fine soil particles and the oil components.

The desilter 700 includes at least one desilter body 710, a pressurization pump (not shown) and a driving unit (not shown) for rotating the desilter body 710. The desilter body 710 may have an upper cylindrical part and a lower conical part both. The desilter body 710 includes a desilter feed inlet 711, a desilter overflow outlet 712 and a desilter underflow outlet 713. The desilter overflow outlet 712 may be provided in the upper portion of the desilter body 710. The desilter underflow outlet 713 may be provided in the lower portion of the desilter body 710. The desilter 700 has basically the same operation principle as the hydro-cyclone apparatus 600 described above. However, the desilter 700 differs from the hydro-cyclone apparatus 600 in that the bubbles, the fine soil particles and the oil components introduced into the desilter 700 are smaller in average particle size than the soil mixture introduced into the hydro-cyclone apparatus 600. Accordingly, the desilter 700 may be configured to separate particles having a smaller particle sizes as compared with the hydro-cyclone apparatus 600. For example, the desilter body 710 may be formed in a smaller size than the cyclone body 610 of the hydro-cyclone apparatus 600 and may be configured to rotate at a higher angular velocity than the cyclone body 610 of the hydro-cyclone apparatus 600. The angular velocity may be controlled by a control unit.

By the centrifugal force generated in the desilter 700, the froth mixture is sorted into a first flow containing fine soil particles and a second flow containing oil components. The first flow is discharged through the desilter underflow outlet 713 of the desilter body 710. The second flow is moved up from the central portion of the desilter body 710 and is discharged through the desilter overflow outlet 712. The fine soil particles discharged through the desilter underflow outlet 713 are fed to the heat treatment desorption apparatus 1000 via a dry bed (not shown). The oil components discharged through the desilter overflow outlet 712 are fed to a separate post-treatment apparatus (not shown).

As described above, the hydro-cyclone apparatus 600 is connected to the wastewater treatment apparatus 800. Hereinafter, the wastewater treatment apparatus 800 will be described.

The wastewater treatment apparatus 800 may include an API (American Petroleum Institute) oil water separator and an induced air flotation oil water separator. The wastewater discharged from the hydro-cyclone apparatus 600 contains a small amount of residual oil and is purified by the wastewater treatment apparatus 800.

The API separator includes a polymer supply device and an aggregation chamber. The API separator is configured to separate water, oil and solid matters using a density difference. The polymer supplied from the polymer supply device is aggregated with fine solid particles in the aggregation chamber and is then precipitated on the bottom of the API separator. Solid matters are deposited on the bottom of the API separator to form a sedimentary layer. Oil is positioned in the upper layer of the API separator. Water is positioned between the solid sedimentary layer and the oil. The API separator is configured to separate fine particles and oil droplets, which are not separated by the hydro-cyclone apparatus 600, from water. For example, the API separator may be configured to oil droplets having a size of about 150 micrometers. The oil separated in the API separator may be stored in a separate oil tank. The water separated in the API separator may be transferred to the induced air flotation oil water separator.

The induced air flotation oil water separator includes an air froth generation device and at least one floatation chamber. The water transferred from the API separator is introduced into the induced air flotation oil water separator. The air froth generation device generates bubbles in the water introduced into the floatation chamber. Fine particles and oil components in the water adhere to the bubbles. The bubbles float to the water surface together with the fine particles and the oil components. The induced air flotation oil water separator is configured to separate fine particles and oil droplets, which are not separated by the API separator, from water.

While there has been described an example in which the wastewater treatment apparatus 800 treats the wastewater used in the hydro-cyclone apparatus 600, this is nothing more than one example. The wastewater treatment apparatus 800 is capable of collecting and treating not only the wastewater used in the hydro-cyclone apparatus 600 but also the wastewater used in the soil remediation facility 10.

Figure 10:
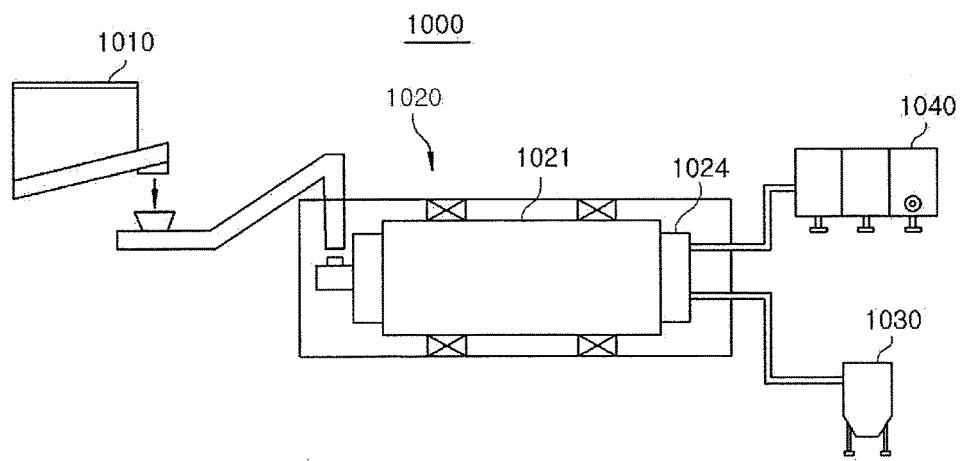
FIG. 10 is a conceptual diagram showing a heat treatment desorption apparatus.

Hereinafter, the heat treatment desorption apparatus 1000 will be described with reference to FIG. 10. FIG. 10 is a conceptual diagram showing the heat treatment desorption apparatus.

Referring to FIG. 10, the heat treatment desorption apparatus 1000 includes a supply unit 1010, an anaerobic thermal desorption unit (ATDU) 1020, a cooler 1030, a steam collection device 1040 and a water treatment unit (not shown).

The supply unit 1010 may include a supply hopper (not shown) and a screw conveyor device (not shown). The fine soil particles introduced into the supply hopper are supplied to the anaerobic thermal desorption unit 1020 through the screw conveyor device.

The anaerobic thermal desorption unit 1020 includes a rotary furnace 1021, a driving device (not shown), a supply unit (not shown), a discharge hood 1024 and a heating device (not shown). The fine soil particles are introduced into the rotary furnace 1021 via the supply unit. The fine soil particles in the rotary furnace 1021 are heated by the heating device. The rotary furnace 1021 is rotated by the driving device. The thermally-treated soil is discharged from the anaerobic thermal desorption unit 1020 through the discharge hood 1024.

The cooler 1030 is configured to cool the soil discharged from the anaerobic thermal desorption unit 1020. For example, the cooler 1030 may be a cooling tower.

The steam generated from the anaerobic thermal desorption unit 1020 is fed to the steam collection device 1040. The steam collection device 1040 may include a pre-scrubber, a venturi scrubber, a fan and a condenser. For example, the steam generated from the anaerobic thermal desorption unit 1020 may be cooled to about 50° C. by the pre-scrubber and, then, may be depressurized by the venturi scrubber. Thereafter, the steam may be cooled to about 6° C. to 7° C. by the fan and the condenser.

The water treatment device is configured to cool process water and to separate oil and solid matters from the process water. The water treatment device may be a device including, for example, a water/oil separator, a heat exchanger, a cooling tower, a pump and the like.

The heat treatment desorption apparatus 1000 may convert the fine soil particles to remedied soil through the process described above. In other words, the fine soil particles may be remedied in the heat treatment desorption apparatus 1000 and may be discharged.

Figure 11:
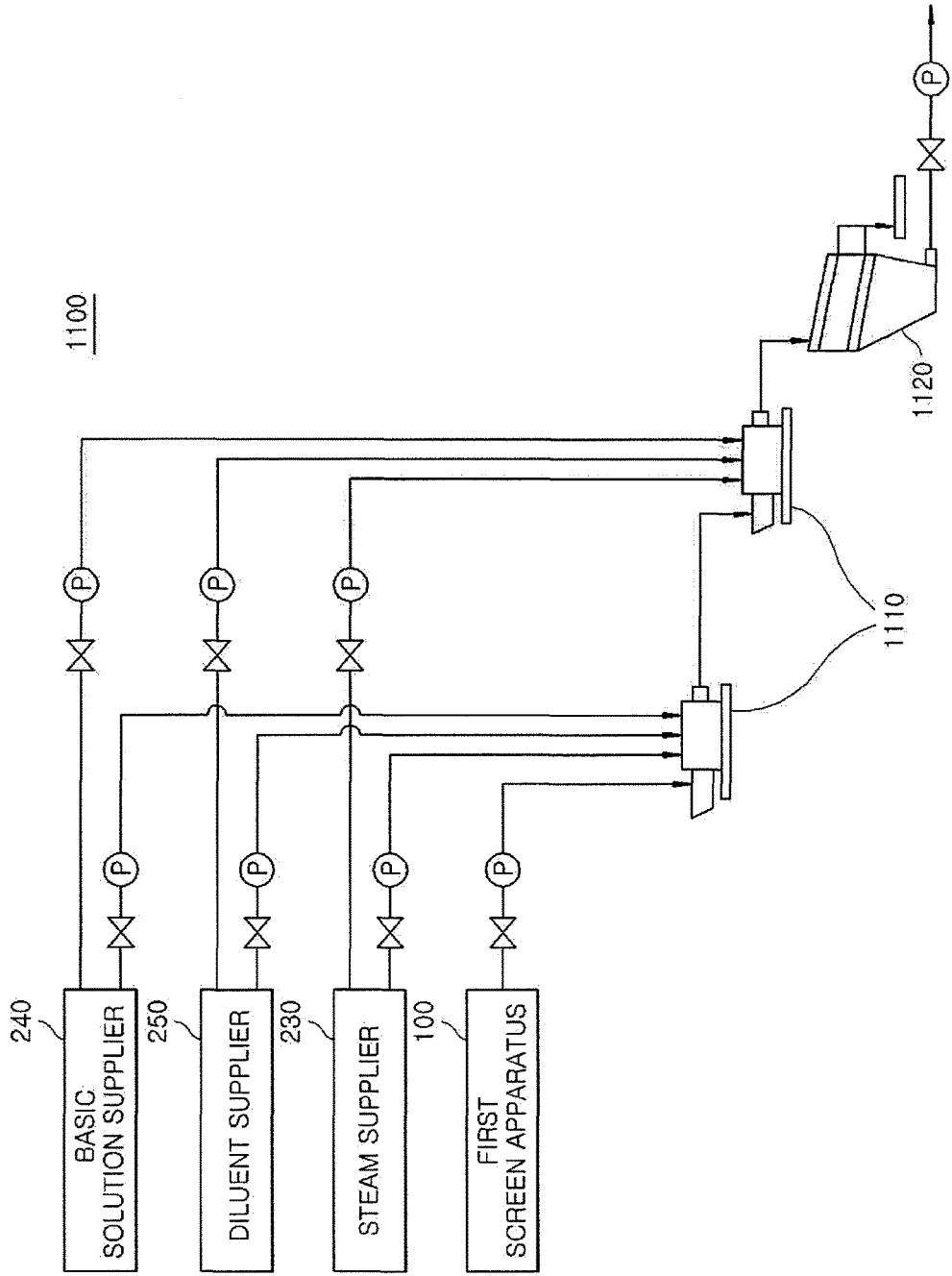
FIG. 11 is a conceptual diagram showing an oversize soil clod treatment apparatus.

Hereinafter, the oversize soil clod treatment apparatus 1100 will be described with reference to FIG. 11. FIG. 11 is a conceptual diagram showing the oversize soil clod treatment apparatus 1100.

Referring to FIG. 11, the oversize soil clod treatment apparatus 1100 may include one or more oversize soil clod treatment drums 1110 and a third screen apparatus 1120. The oversize soil clod treatment apparatus 1100 may perform an oversize soil clod treatment process of treating oversize soil clod.

The oversize soil clod treatment drums 1110 are configured to physically pulverize the introduced oversize soil clod. The third screen apparatus 1120 is configured to separate the pulverized contaminated soil having a predetermined size or less. The contaminated soil mixture pulverized by the oversize soil clod treatment apparatus 1100 is introduced into the second screen apparatus 400. The oversize soil clod not pulverized is fed to a separate post-treatment apparatus (not shown).

The specific configuration of the oversize soil clod treatment drums 1110 may be substantially the same as the configuration of the drum mixer apparatus 200 described above. Thus, as for the detailed description of the oversize soil clod treatment drums 1110, the description on the drum mixer apparatus 200 is incorporated herein by reference. Furthermore, the specific configuration of the third screen apparatus 1120 is the same as the configuration of the second screen apparatus 400. Thus, as for the detailed description of the third screen apparatus 1120, the description on the second screen apparatus 400 is incorporated herein by reference.

There may be provided a plurality of oversize soil clod treatment apparatuses 1100.

If necessary, the soil remediation facility 10 according to the present embodiment may further include a water supply device, a steam supply device, a water collection device, an oil collection device, an evaporation pond and a cooler.

While the invention has been shown and described with respect to the embodiments, the present invention is not limited thereto. It will be understood by those skilled in the art that various changes and modifications may be made without departing from the scope of the invention as defined in the following claims.

What is claimed is:

1. A soil remediation facility, comprising:
 a first screen apparatus including a first vibratory screen and configured to cause contaminated soil to pass through the first vibratory screen and to separate oversize soil clods from the contaminated soil;
 a drum mixer apparatus configured to receive the contaminated soil from the first screen apparatus and mix the contaminated soil with a diluent, a saturated steam and hot water;
 a scrubbing apparatus including a mixing container and an impeller configured to rotate to apply a shear force to the soil mixture introduced into the mixing container;
 a second screen apparatus including a second vibratory screen and configured to separate cleaned relatively large size of soil particles from a soil mixture produced in the scrubbing apparatus by allowing small particles and contaminants to pass through a second screen apparatus;
 a floatation apparatus configured to receive the soil mixture from the scrubbing apparatus, add a chemical agent for generating bubbles to the soil mixture, inject air into the soil mixture to desorb contaminants from the soil mixture, and separate the desorbed contaminants by causing the desorbed contaminants to float;
 a hydro-cyclone apparatus configured to receive at least a part of the soil mixture discharged from the floatation apparatus and swirl substances contained in the received soil mixture to sort the substances depending on a particle size; and
 a desilter configured to receive at least a part of the soil mixture discharged from the floatation apparatus and swirl substances contained in the received soil mixture at a higher angular velocity than an angular velocity in the hydro-cyclone apparatus to sort the substances depending on a particle size.

2. The soil remediation facility of claim 1, wherein the drum mixer apparatus includes a rotary drum provided with a blade, and a driving motor configured to drive at least one of the rotary drum and the blade, and
 wherein the contaminated soil is mixed with the diluent, the saturated steam and the hot water by rotating at least one of the blade and the rotary drum.

3. The soil remediation facility of claim 1, wherein the floatation apparatus includes a conditioner cell and a floatation cell,
 wherein the conditioner cell and the floatation cell are disposed so that the soil mixture sequentially passes through the conditioner cell and the floatation cell, and
 wherein the chemical agent for generating bubbles is supplied to the conditioner cell and the air is supplied to the floatation cell by a blower.

4. The soil remediation facility of claim 1, wherein the hydro-cyclone apparatus includes a cyclone body including a feed inlet through which the soil mixture discharged from the floatation apparatus is introduced, an overflow outlet and an underflow outlet respectively,
 wherein a part of the soil mixture introduced into the cyclone body is discharged through the overflow outlet, the remainder of the soil mixture introduced into the cyclone body being discharged through the underflow outlet, and
 wherein the soil mixture discharged through the overflow outlet is smaller in size than the soil mixture discharged through the underflow outlet.

5. The soil remediation facility of claim 1, wherein the desilter includes a desilter body,
 the desilter body includes a desilter feed inlet through which the soil mixture discharged from the floatation apparatus is introduced, a desilter overflow outlet and a desilter underflow outlet,
 wherein a part of the soil mixture introduced into the desilter body is discharged through the desilter overflow outlet, the remainder of the soil mixture introduced into the desilter body being discharged through the desilter underflow outlet, and
 wherein the soil mixture discharged through the desilter overflow outlet is smaller in size than the soil mixture discharged through the desilter underflow outlet.

6. The soil remediation facility of claim 1, wherein the first vibratory screen of the first screen apparatus includes a first internal screen and a second internal screen, each of the first internal screen and the second internal screen includes a sieve, the first internal screen and the second internal screen being spaced apart from each other by a predetermined distance, and the sieve of the first internal screen is larger in sieve opening size than the sieve of the second internal screen.

7. The soil remediation facility of claim 1, wherein the impeller of the scrubbing apparatus includes a first impeller and a second impeller provided inside the mixing container, the first impeller and the second impeller are provided in pair, and the first impeller and the second impeller are configured to cause the soil mixture to flow in opposite directions.

8. The soil remediation facility of claim 1, wherein the scrubbing apparatus includes:

a first attrition scrubber including the mixing container and the impeller configured to rotate to apply a shear force to the soil mixture introduced into the mixing container;

a centrifugal separator provided on a downstream side of the first attrition scrubber; and a second attrition scrubber connected to the first attrition scrubber and the centrifugal separator, wherein the soil mixture passing through the first attrition scrubber is supplied to at least one of the second attrition scrubber and the centrifugal separator, and the soil mixture passing through the centrifugal separator is supplied to the second attrition scrubber.

9. The soil remediation facility of claim 8, wherein the centrifugal separator is configured to receive the soil mixture passing through the first attrition scrubber, remove a clay component from the soil mixture passing through the first attrition scrubber, and transfer the soil mixture, from which the clay component is removed, to the second attrition scrubber.

10. The soil remediation facility of claim 6, wherein the second vibratory screen of the second screen apparatus includes a first internal screen and a second internal screen, each of the first internal screen and the second internal screen of the second screen apparatus includes a sieve, the first internal screen and the second internal screen of the second screen apparatus being spaced apart from each other by a predetermined distance, the sieve of the first internal screen of the second screen apparatus is smaller in sieve opening size than the sieve of the second internal screen of the first screen apparatus, and the sieve of the second internal screen of the second screen apparatus is smaller in sieve opening size than the sieve of the first internal screen of the second screen apparatus.

11. The soil remediation facility of claim 1, wherein the floatation apparatus is configured to sort the soil mixture into a first soil mixture containing bubbles and a second soil mixture containing a smaller amount of bubbles than the first soil mixture.

12. The soil remediation facility of claim 11, wherein the floatation apparatus includes a froth tank and a pre-treatment soil tank, and wherein the floatation apparatus is configured to feed the first soil mixture to the froth tank and feed the second soil mixture to the pre-treatment soil tank.

13. The soil remediation facility of claim 3, wherein the conditioner cell is configured to discharge a part of the soil mixture to the floatation cell and discharge the remainder of the soil mixture.

14. The soil remediation facility of claim 1, further comprising:

an oversize soil clod treatment apparatus, wherein the oversize soil clod treatment apparatus includes an oversize soil clod treatment drum and a third screen apparatus, and the oversize soil clod treatment apparatus is configured to cause oversize soil clod separated in the first screen apparatus to sequentially pass through the oversize soil clod treatment drum and the third screen apparatus.

15. The soil remediation facility of claim 3, wherein the floatation apparatus further includes a froth tank and a pre-treatment soil tank, and the floatation apparatus is configured to feed the bubbles generated in the conditioner cell and the floatation cell to the froth tank and feed the soil mixture discharged from the floatation cell to the pre-treatment soil tank.

16. A soil remediation method, comprising:

a first screen step of causing contaminated soil to pass through a first vibratory screen of a first screen apparatus and separating oversize soil clod from the contaminated soil;

a mixing step of supplying the contaminated soil passed through the first screen apparatus to a drum mixer apparatus and mixing the contaminated soil with a diluent, a saturated steam and hot water;

a scrubbing step of supplying the soil mixture to a scrubbing apparatus and applying a shear force to the soil mixture by rotating at least one of a mixing container and an impeller provided in the scrubbing apparatus;

a second screen step of separating cleaned relatively large size of soil particles from the soil mixture produced in the scrubbing step by allowing small particles and contaminants to pass through a second screen apparatus;

a floating step of transferring the soil mixture from the scrubbing apparatus to a floatation apparatus, adding a chemical agent for generating bubbles to the soil mixture transferred to the floatation apparatus, injecting air into the soil mixture, and causing contaminants desorbed from the soil mixture to float;

a hydro-cyclone step of transferring at least a part of the soil mixture discharged from the floatation apparatus to a hydro-cyclone apparatus, swirling substances contained in the soil mixture transferred to the hydro-cyclone apparatus, and sorting the substances depending on a particle size; and a desilter step of transferring at least a part of the soil mixture discharged from the floatation apparatus to a desilter, swirling substances contained in the soil mixture transferred to the desilter at a higher angular velocity than an angular velocity in the hydro-cyclone apparatus, and sorting the substances depending on a particle size.

17. The soil remediation method of claim 16, wherein in the mixing step, the contaminated soil is mixed with the diluent, the saturated steam and the hot water by rotating at least one of a blade and rotary drum of the drum mixer apparatus.

18. The soil remediation method of claim 16, wherein the floatation step includes:

the soil mixture transferred to the floatation apparatus sequentially through a conditioner cell and a floatation cell of the floatation apparatus, and supplying the chemical agent for generating bubbles to the conditioner cell and supplying the air to the floatation cell by a blower.

19. The soil remediation method of claim 16, wherein the hydro-cyclone step includes:
discharging a part of the soil mixture introduced into a cyclone body of the hydro-cyclone apparatus through an overflow outlet of the cyclone body, and discharging the remainder of the soil mixture introduced into the cyclone body through an underflow outlet of the cyclone body,
wherein the soil mixture discharged through the overflow outlet is smaller in size than the soil mixture discharged through the underflow outlet.

20. The soil remediation method of claim 16, further comprising:
discharging a part of the soil mixture introduced into a desilter body of the desilter through a desilter overflow outlet of the desilter body, and discharging the remainder of the soil mixture introduced into the desilter body through a desilter underflow outlet of the desilter body,
wherein the soil mixture discharged through the desilter overflow outlet is smaller in size than the soil mixture discharged through the desilter underflow outlet.

* * * * *